(No Model.)

W. H. LAWRENCE.
CARBON AMALGAMATOR.

No. 377,901. Patented Feb. 14, 1888.

Witnesses:
L. Prulitt.
E. F. Gage.

Inventor:
W. H. Lawrence,
by C. N. Woxce, Atty.

UNITED STATES PATENT OFFICE.

WASHINGTON H. LAWRENCE, OF CLEVELAND, OHIO.

CARBON-AMALGAMATOR.

SPECIFICATION forming part of Letters Patent No. 377,901, dated February 14, 1888.

Application filed April 2, 1887. Serial No. 233,521. (No model.)

*To all whom it may concern:*

Be it known that I, WASHINGTON H. LAWRENCE, a citizen of the United States, residing at Cleveland, in the county of Cuyahoga and State of Ohio, have invented certain new and useful Improvements in Apparatus for Amalgamating Carbon Materials; and I hereby declare that the following is a full, clear, and exact description of said invention, such as will enable others skilled in the art to which it pertains to make and use the same.

My invention relates to improvements in amalgamating the materials for the manufacture of carbons; and it consists in the construction and combination of parts, hereinafter described and specifically pointed out in the claims, the object being to secure a perfect amalgamation of the various substances used and the facility for accomplishing this speedily and with large quantities of material.

Figure 1:
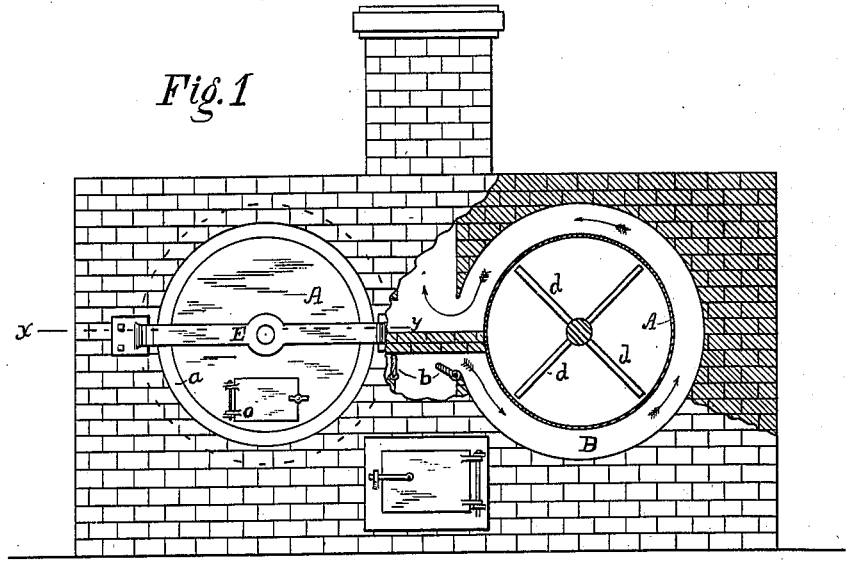
Figure 2:
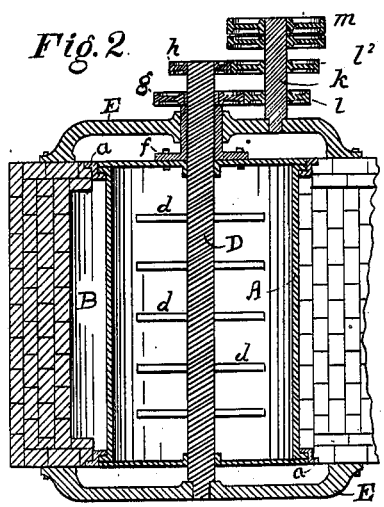
Figure 3:
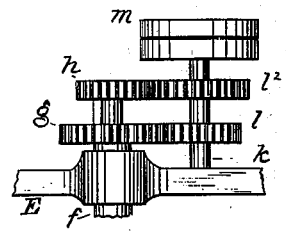

In the accompanying drawings, Figure 1 represents a view in elevation, partly broken away to show interior construction, of a furnace with a series of amalgamating-cylinders, the whole arranged according to my invention. Fig. 2 is a partial sectional view, taken on the line $x\,y$, of the apparatus shown in Fig. 1; and Fig. 3 is a plan view from above of the driving-gear for revolving the cylinder and shaft, shown as a detached view.

In the manufacture of carbons one of the chief obstacles to obtaining the necessary homogeneity is the difficulty of securing a perfect amalgamation of the materials, which has to be done under heat, owing to the tendency of the finely-ground carbon-dust, pitch, and other materials, when stirred or shaken in the ordinary methods, to separate into layers, according to the gravity of the various materials, and to form into more or less compact masses during the operation and before a thorough commingling and amalgamation of the ingredients is secured, such masses, when formed, resisting to some extent the action of the apparatus employed to effect the amalgamation, in consequence of which the carbons, when formed, are not homogeneous, but differ in the proportions of the ingredients in various parts. To obviate these difficulties I make use of the mechanism shown in the drawings, which consists, essentially, of a cylindrical vessel, A, known in the art as an "amalgamator," placed horizontally and supported in a suitable frame, $a$, at each end, so as to be revolved therein by the means presently to be described.

The cylinder A is so placed that a flue or flues, B, from the furnace C pass nearly or quite around the cylinder before entering the smoke-stack, which flue is provided with dampers $b$, by which the heat may be regulated. A shaft, D, passes centrally through the cylinder A, and is supported at each end in bearings E, independent of the cylinder, one of which bearings receives a sleeve, $f$, rigidly secured at one end to the cylinder A, and bearing at its other end suitable gears, $g$, by which, or, if preferred, by a pulley, the sleeve and cylinder are revolved. The shaft D passes through the sleeve $f$ as a bearing, and, being provided at its outer end with suitable gearing, $h$, is also connected with the power, so as to be revolved independently of the cylinder A and in either direction; but I prefer to arrange a back shaft, $k$, provided with gears $l\,l'$, meshing, respectively, with the gears $g$ and $h$, and to so proportion the various gears as to drive the shaft D at about six times the speed of the cylinder A and in the same direction, the shaft $k$ being driven by pulleys $m$. Within the cylinder the shaft D is provided with rigid arms $d$, extending to near the shell of the cylinder, which are preferably set in two or more series at an equal angle with each other, and serve as beaters to stir the charge in the cylinder A and prevent the formation of lumps, and may be arranged to act as conveyers to discharge the contents of the cylinder, if desired.

In one end of the cylinder A is provided a door, $o$, which may be securely closed, and through which the charge is introduced to and withdrawn from the cylinder; and in practice it is preferable to fill the cylinder not more than about one quarter full to obtain the best results.

When the mixed materials are charged into the amalgamator, they are distributed as equally as possible in the cylinder, which is then securely closed and set in motion and rolls the materials over from the ascending side, while the arms $d$, moving in the same direction, but at greater speed, continually stir and mix the materials and prevent the formation of lumps or the separation of the lighter or coarser particles. The operation is continued for from fifteen to twenty minutes, the heat being adjusted as the nature of the materials may require, and insures the complete and perfect amalgamation of the ingredients into a homogeneous mixture.

For the sake of economy in operation, I prefer to arrange two or more amalgamators in a series, all of which may be heated by the same furnace, and a part of which may be in operation while the others are being discharged. In Fig. 1 two amalgamators are shown so arranged; but a greater number may be so arranged, if desired.

What I claim, and desire to secure by Letters Patent, is—

1. In a carbon-amalgamator, the combination of a horizontal revolving vessel, a furnace for heating said vessel, and stirring-arms revolving therein at a speed different from that of the containing-vessel, substantially as and for the purposes set forth.

2. In a carbon-amalgamator, the combination of a horizontal revolving vessel, a furnace for heating the same, stirring arms revolving in said vessel, and mechanism for revolving each independently, substantially as described.

3. In a carbon-amalgamator, the combination of a horizontal revolving vessel, stirring-arms revolving therein in the same direction as the vessel, a furnace for heating said vessel, and mechanism for revolving the arms independently of the vessel, substantially as described.

4. In a carbon-amalgamator, the combination of a horizontal cylindrical revolving vessel, a furnace for heating the same, a shaft centrally revolving in said vessel, stirring-arms extending from said shaft in alternating series, and mechanism for revolving both the vessel and the shaft at different speeds, substantially as described.

5. In a carbon-amalgamator, the combination of a horizontal revolving cylindrical vessel, a furnace for heating the same, a shaft centrally revolving in said vessel, stirring-arms extending from said shaft in alternating series, and mechanism for revolving both the vessel and the shaft in the same direction, but at different rates of speed, substantially as described.

6. In a carbon-amalgamator, the cylindrical vessel A, surrounded by a heating-flue and supported horizontally in frames, permitting its free revolution therein, in combination with a shaft provided with stirring-arms and extending centrally through the vessel, and means for revolving said cylinder and shaft independently, substantially as described.

7. The combination, in a carbon-amalgamating apparatus, of a revolving cylindrical vessel horizontally supported in bearing-frames, a heating flue or flues surrounding the cylinder, a shaft extending centrally through the cylinder and bearing stirring-arms, and mechanism for simultaneously revolving the cylinder and shaft at different rates of speed, substantially as described.

8. The combination, in a carbon-amalgamating apparatus, of two or more horizontal cylindrical vessels arranged in series and heated by flues from the same furnace, with dampers for directing and regulating the heat to each cylinder, a shaft with stirring-arms arranged centrally in each cylinder, and mechanism for revolving the several cylinders and shafts independently, all substantially as described.

9. The combination of the flue B, revolving cylinder A, shaft D, arms $d$, sleeve $f$, bearings E, and gears $g\ h\ l\ l'$, all arranged and operating substantially as described.

W. H. LAWRENCE.

Witnesses:
L. PRENTISS,
C. M. VORCE.